United States Patent
Miura et al.

(10) Patent No.: US 10,571,127 B2
(45) Date of Patent: Feb. 25, 2020

(54) GAS TURBINE COMBUSTOR

(71) Applicant: Mitsubishi Hitachi Power Systems, Ltd., Yokohama (JP)

(72) Inventors: Keisuke Miura, Yokohama (JP); Yasuhiro Akiyama, Yokohama (JP); Tomohiro Asai, Yokohama (JP); Kazuki Abe, Yokohama (JP); Mitsuhiro Karishuku, Yokohama (JP); Satoshi Dodo, Yokohama (JP); Akinori Hayashi, Yokohama (JP); Yoshitaka Hirata, Yokohama (JP); Noboru Okuyama, Yokohama (JP)

(73) Assignee: Mitsubishi Hitachi Power Sytems, Ltd., Yokohama (JP)

(*) Notice: Subject to any disclaimer, the term of this patent is extended or adjusted under 35 U.S.C. 154(b) by 274 days.

(21) Appl. No.: 15/790,470

(22) Filed: Oct. 23, 2017

(65) Prior Publication Data

US 2018/0112879 A1 Apr. 26, 2018

(30) Foreign Application Priority Data

Oct. 24, 2016 (JP) .................................. 2016-207775

(51) Int. Cl.
*F23R 3/60* (2006.01)
*F23R 3/08* (2006.01)
(Continued)

(52) U.S. Cl.
CPC ................ *F23R 3/286* (2013.01); *F02C 3/05* (2013.01); *F23D 14/64* (2013.01); *F23R 3/002* (2013.01);
(Continued)

(58) Field of Classification Search
CPC ..... F23R 3/60; F23R 3/002; F23R 3/08; F23R 2900/0005; F23R 2900/00012; F02C 7/28
See application file for complete search history.

(56) References Cited

U.S. PATENT DOCUMENTS

| | | | |
|---|---|---|---|
| 9,562,687 B2* | 2/2017 | Johnson | .................... F23R 3/04 |
| 2010/0300116 A1* | 12/2010 | Kaleeswaran | .......... F01D 9/023 60/800 |

(Continued)

FOREIGN PATENT DOCUMENTS

| | | |
|---|---|---|
| EP | 3 141 817 A1 | 3/2017 |
| JP | 2-309123 A | 12/1990 |

(Continued)

OTHER PUBLICATIONS

Korean-language Office Action issued in counterpart Korean Application No. 10-2017-0135542 dated Jan. 21, 2019 with English translation (11 pages).

(Continued)

*Primary Examiner* — Carlos A Rivera
(74) *Attorney, Agent, or Firm* — Crowell & Moring LLP (57) ABSTRACT

The gas turbine combustor includes a swirler lip on the air hole plate periphery, protruding toward a chamber, and a spring seal in an area for fitting the liner and the plate/lip. The spring seal has an air hole for passage of part of the combustion air introduced in the gap between the outer periphery of the air hole plate and the liner. The swirler lip has an air hole which introduces part of the combustion air passing through the spring seal air hole into the chamber. The liner has an air hole facing the spring seal air hole, to introduce part of air from outside the liner into the gap between the outer periphery of the air hole plate and the (Continued)

liner. A turn guide for rectifying a combustion air flow is provided at the liner end portion on the side for fitting the liner and air hole plate.

9 Claims, 4 Drawing Sheets (51) Int. Cl.
*F23R 3/00* (2006.01)
*F02C 7/28* (2006.01)
*F23R 3/28* (2006.01)
*F02C 3/05* (2006.01)
*F23D 14/64* (2006.01)
*F23R 3/12* (2006.01)
*F23R 3/58* (2006.01)
*F24H 3/04* (2006.01)
*F02C 7/22* (2006.01)
*F23R 3/20* (2006.01)

(52) U.S. Cl.
CPC ............... *F23R 3/08* (2013.01); *F23R 3/12* (2013.01); *F23R 3/58* (2013.01); *F23R 3/60* (2013.01); *F24H 3/0488* (2013.01); *F02C 7/222* (2013.01); *F02C 7/28* (2013.01); *F23R 3/20* (2013.01); *F23R 2900/00005* (2013.01); *F23R 2900/00012* (2013.01); *Y02B 30/28* (2013.01)

(56) References Cited

U.S. PATENT DOCUMENTS

| | | |
|---|---|---|
| 2011/0252805 A1 | 10/2011 | Dwight et al. |
| 2012/0045725 A1 | 2/2012 | Takiguchi et al. |
| 2012/0047904 A1* | 3/2012 | Wasif ................. F23R 3/08 60/752 |
| 2014/0007582 A1 | 1/2014 | Abe et al. |
| 2014/0013762 A1* | 1/2014 | Takiguchi ............ F23R 3/42 60/737 |
| 2014/0083102 A1* | 3/2014 | Miura ................... F23R 3/286 60/737 |
| 2016/0003481 A1* | 1/2016 | Taniguchi ............ F23R 3/42 60/737 |
| 2017/0138598 A1* | 5/2017 | Akiyama ............. F23R 3/002 |
| 2017/0284672 A1* | 10/2017 | Tsunoda .............. F02C 7/18 |

FOREIGN PATENT DOCUMENTS

| | | |
|---|---|---|
| JP | 8-284688 A | 10/1996 |
| JP | 2011-226481 A | 11/2011 |
| JP | 2013-108423 A | 6/2013 |
| JP | 2014-16059 A | 1/2014 |
| JP | 2014-62702 A | 4/2014 |
| KR | 10-2012-0019441 A | 3/2012 |
| RU | 2 493 494 C1 | 9/2013 |

OTHER PUBLICATIONS

European Search Report issued in counterpart Application No. 17197585.7-1008 dated Mar. 16, 2018 (five (5) pages).

Hindi-language Office Action issued in counterpart Indian Application No. 201714036932 dated Oct. 30, 2019 with English translation (six (6) pages).

* cited by examiner

GAS TURBINE COMBUSTOR

CLAIM OF PRIORITY

The present application claims priority from Japanese Patent application serial no. 2016-207775, filed on Oct. 24, 2016, the content of which is hereby incorporated by reference into this application.

FIELD OF THE INVENTION

The present invention relates to the structure of a gas turbine combustor and more particularly to technology useful for a gas turbine combustor with a multi-cluster burner structure.

BACKGROUND OF THE INVENTION

In order to improve the efficiency of a gas turbine, the combustion temperature must be increased and in order to cope with increased combustion temperature, efforts have been made to develop various heat-resistant materials and cooling techniques for high-temperature members of the gas turbine.

As the combustion temperature increases, emissions of nitrogen oxide or so-called thermal NOx increase in an exponential manner, so it is necessary to take countermeasures against increase in thermal NOx emissions. As a technique to achieve low NOx emissions, a combustor with a multiple-injection burner (multi-cluster burner) structure which enables distributed lean combustion has been developed. The multi-cluster burner includes an air hole plate with many air holes and fuel nozzles arranged coaxially with the air holes. It decreases NOx emissions by mixing fuel and air as an oxidant quickly in a short distance of about several tens of millimeters in each air hole and thus generating a lean premixed combustion field.

An example of the related art in this technical field is the technique described in Japanese Patent Laid-Open No. 2013-108423 (Patent Literature 1). Patent Literature 1 discloses a gas turbine combustor including fuel nozzles and an air hole plate with air holes, in which a seal member is provided in an area where a liner and the air hole plate are fitted to each other; in an air hole of the air hole plate, an air hole portion located near a fuel nozzle has a straight pipe part coaxial with the fuel nozzle and shaped like a straight pipe and, and a portion of the air hole located near a chamber has an inclined part inclined at an inclination angle with respect to the axis of the chamber. The air hole plate is constituted of a plurality of members which include a straight pipe air hole plate member forming the straight pipe part and an inclined air hole plate forming the inclined part. The material of the straight pipe air hole plate member is different from the material of the inclined air hole plate member.

SUMMARY OF THE INVENTION

As mentioned above, although the multi-cluster burner structure is effective in achieving low-NOx emissions, a cooling structure to cool the area around the air hole plate effectively is needed since the air hole plate is provided inside the combustor.

Figure 7A:
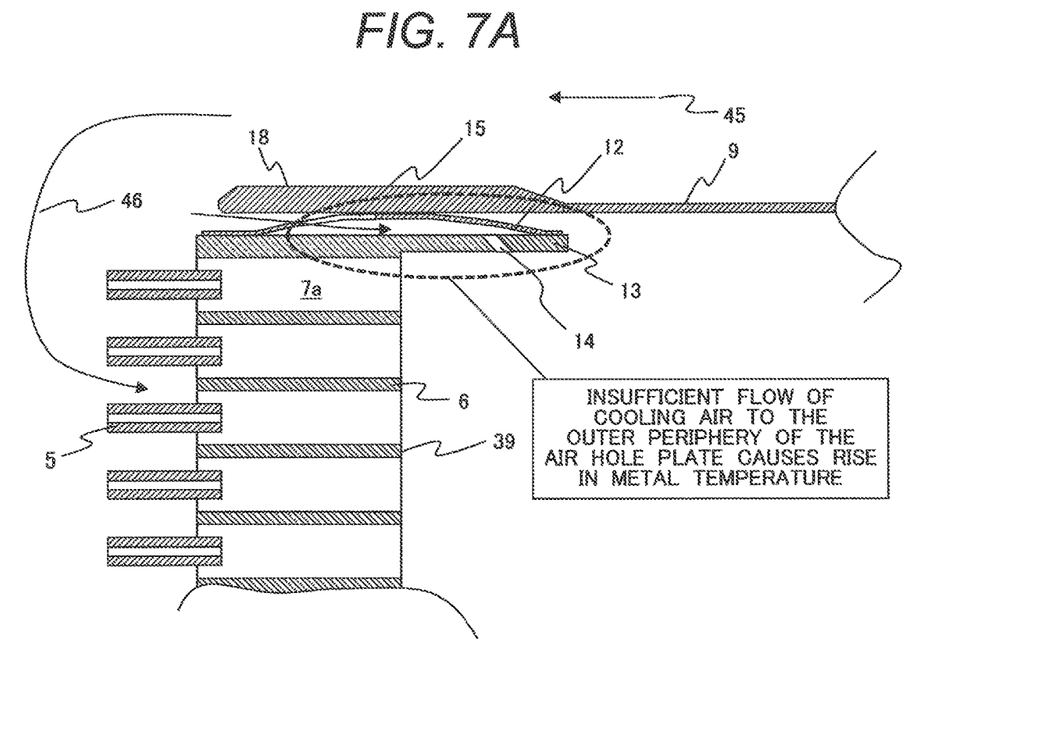
FIG. 7A shows a problem with a gas turbine combustor.
Figure 7B:
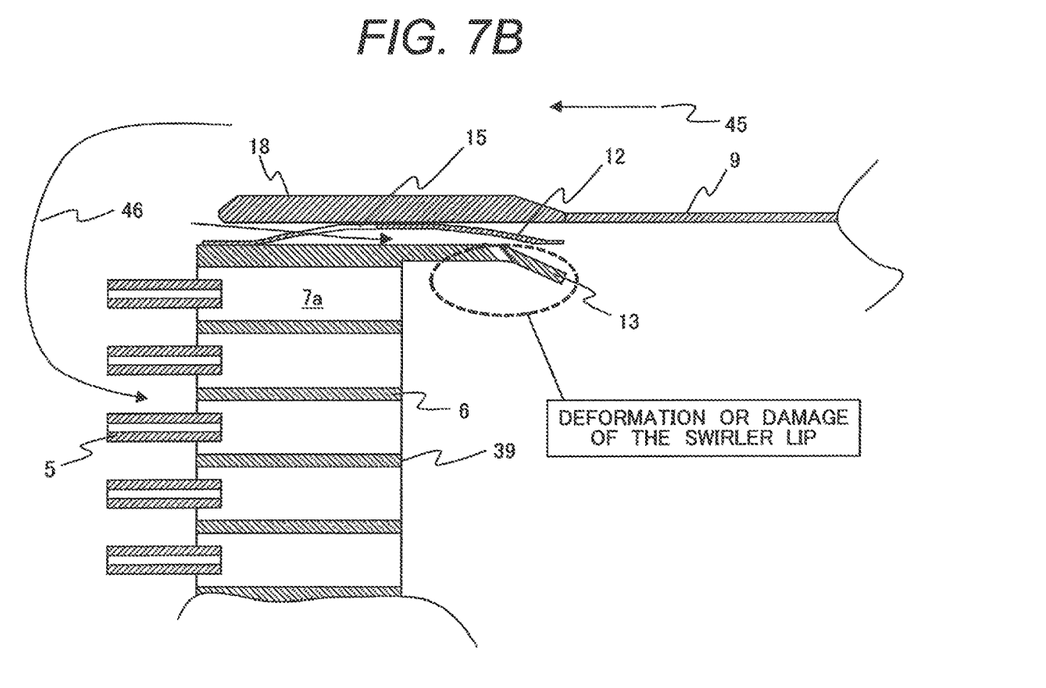
FIG. 7B shows a problem with a gas turbine combustor.

Next, the problem with a gas turbine combustor with a multi-cluster burner structure will be described referring to FIGS. 7A and 7B. FIGS. 7A and 7B are both fragmentary sectional views which show the structure of the outer peripheral area of the air hole plate. As shown in FIG. 7A, part of combustion air 45 is introduced into the gap between the air hole plate 6, liner 9 and inner cylinder short pipe 18 to cool the outer peripheral area of the air hole plate 6.

However, since the combustion air 45 becomes a return flow 46 at the upstream end of a main burner 39, a separation vortex is formed in the return flow 46 and the air hardly flows into an air inflow hole 15 made in a spring seal 12 as a seal member and cooling air cannot be supplied to a cooling hole 14 of a swirler lip 13 provided on the outer periphery of the air hole plate 6, thus making it impossible to cool the swirler lip 13 adequately. As a consequence, the metal temperature of the swirler lip 13 rises and as shown in FIG. 7B, damage of the swirler lip 13 such as deformation or fracture may result.

In addition, under the influence of the separation vortex in the return flow 46 of combustion air, the air hardly flows into an air hole 7a on the peripheral side of the air hole plate 6, so the ratio of fuel flow rate to air flow rate increases and thus the flame temperature rises, which may cause an increase in nitrogen oxide (NOx) emissions. Particularly, this tendency is remarkable in the case of a combustor with a multi-cluster burner structure in which a small air hole and a fuel nozzle make a pair.

Patent Literature 1 concerns a seal plate (seal member) which makes it easy to form an air hole plate with many air holes and ensures adequate sealing performance without shortening the service life of the seal plate. However, it does not describe the problem with rise in the metal temperature in the outer peripheral area of the air hole plate as mentioned above and supply of cooling air.

One object of the present invention is to cool the outer peripheral area of an air hole plate effectively in a gas turbine combustor with a multi-cluster burner structure and thereby provide a highly reliable gas turbine combustor which can prevent deformation or damage of a swirler lip on the outer periphery of the air hole plate.

Another object of the present invention is to provide a gas turbine combustor with a multi-cluster burner structure which supplies a sufficient amount of combustion air to air holes on the peripheral side of the air hole plate and thereby improves combustion characteristics and reduces nitrogen oxide (NOx) emissions.

In order to solve the above problem, according to one aspect of the present invention, there is provided a coaxial injection gas turbine combustor which includes: a liner constituting a chamber of the gas turbine combustor; a plurality of fuel nozzles to inject fuel into the chamber; and an air hole plate which is located downstream of the fuel nozzles in a fuel flow direction and has a plurality of air holes corresponding to the fuel nozzles. In the combustor, a swirler lip is provided on the outer periphery of the air hole plate in a manner to protrude toward the chamber and a spring seal is provided in an area where the liner is fitted to the air hole plate and the swirler lip. The spring seal has an air hole to enable part of combustion air introduced into a gap between the outer periphery of the air hole plate and the liner to pass. The swirler lip has an air hole to introduce part of the combustion air passing through the air hole of the spring seal into the chamber. The liner has an air hole in a position to face the air hole of the spring seal, in order to introduce part of the combustion air from outside of the liner into the gap between the outer periphery of the air hole plate and the liner. A turn guide for rectifying a flow of combustion air is provided at an end portion of the liner on a side where the liner is fitted to the air hole plate.

According to the present invention, it is possible to provide a highly reliable gas turbine combustor with a multi-cluster burner structure which can prevent deformation or damage of a swirler lip on the outer periphery of an air hole plate.

According to the present invention, it is also possible to provide a gas turbine combustor with a multi-cluster burner structure which further reduces nitrogen oxide (NOx) emissions.

Other and further objects, features and advantages of the invention will more fully appear from the following detailed description in this specification.

DETAILED DESCRIPTION OF THE PREFERRED EMBODIMENTS

Next, the preferred embodiments of the present invention will be described referring to the accompanying drawings. Basically in all the drawings, the same elements are designated by the same reference numerals and repeated descriptions of the same elements are omitted.

First Embodiment

Figure 1:
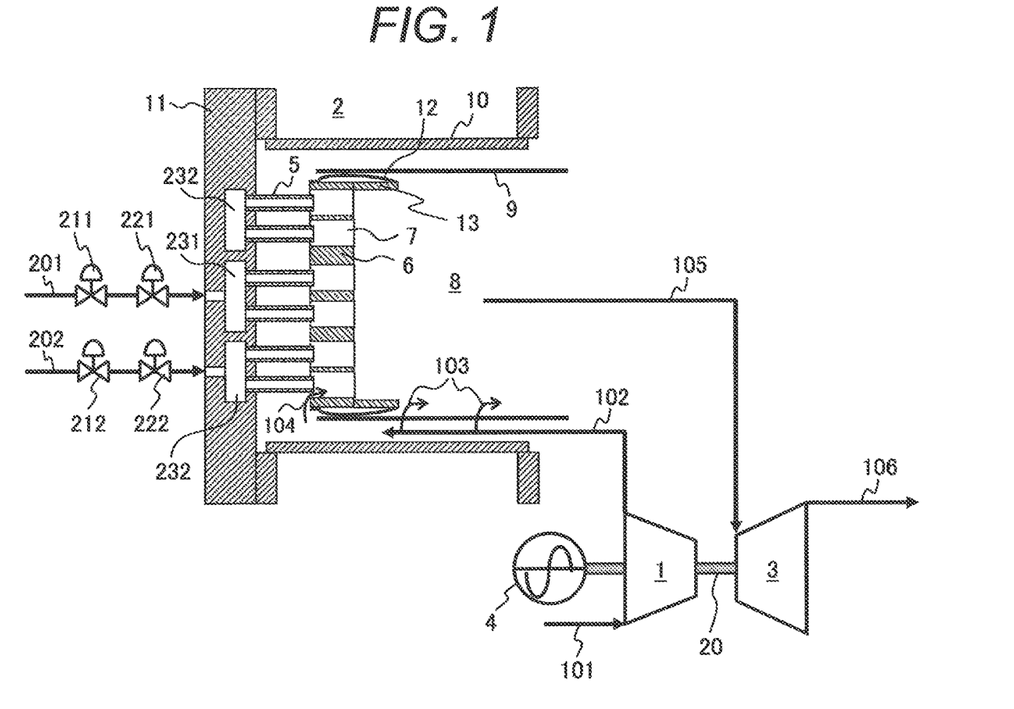
FIG. 1 is a schematic diagram which shows a gas turbine combustor according to an embodiment of the present invention and the general configuration of a gas turbine plant including the gas turbine combustor.
Figure 2:
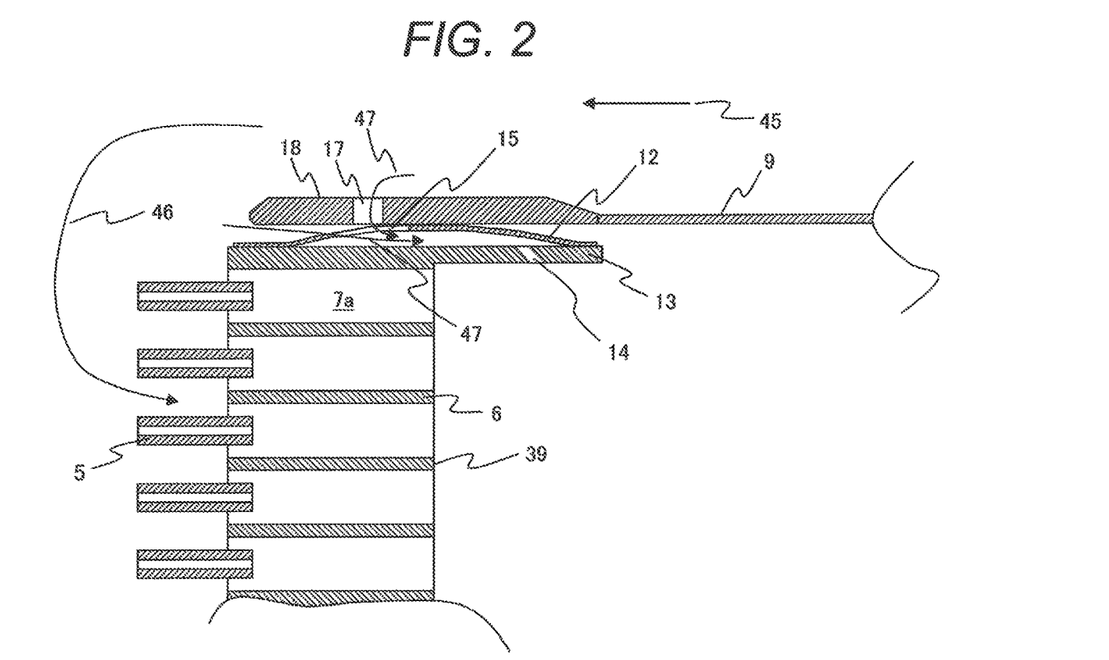
FIG. 2 is a fragmentary sectional view which schematically shows the structure of a gas turbine combustor according to an embodiment of the present invention.
Figure 3:
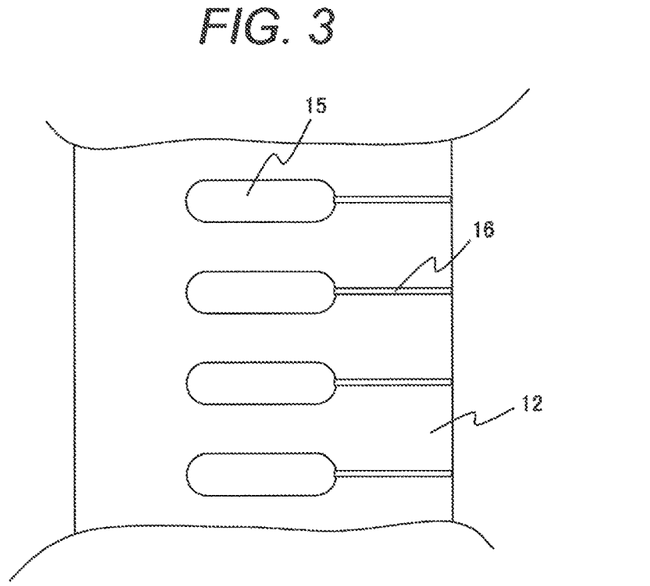
FIG. 3 is a view which schematically shows the structure of a spring seal of a gas turbine combustor according to an embodiment of the present invention.

A gas turbine combustor according to the first embodiment will be described, referring to FIGS. 1 to 3. FIG. 1 conceptually shows a gas turbine combustor according to the present embodiment and the general configuration of a gas turbine plant including the gas turbine combustor. FIG. 2 is a fragmentary sectional view which shows the structure of the outer peripheral area of an air hole plate of the gas turbine combustor shown in FIG. 1. FIG. 3 is a plan view which shows the structure of the spring seal 12 shown in FIG. 2.

As shown in FIG. 1, the gas turbine plant includes: a compressor 1 which compresses air 101 to generate high pressure compressed air (air for combustion) 102; a gas turbine combustor 2 which mixes the compressed air 102 introduced from the compressor 1 and fuel (201, 202) to generate combustion gas 105; a gas turbine 3 which is driven by introduction of the combustion gas 105 generated by the gas turbine combustor 2; and an electric generator 4 which is driven by rotation of the gas turbine 3 to generate electricity.

The compressor 1, gas turbine 3 and generator 4 are mutually connected by a rotor 20 so that by rotation of the gas turbine 3, the compressor 1 is driven and the generator 4 connected to the compressor 1 is driven.

Although FIG. 1 shows a single-axis gas turbine in which the compressor 1, gas turbine 3, and generator 4 are mutually connected by a rotor 20, the present invention is also applicable to a double-axis gas turbine in which the compressor and a portion of the gas turbine are connected by a rotor and another portion of the gas turbine and the generator are connected by another rotor.

The gas turbine combustor 2 includes: many fuel nozzles 5 which inject fuel (201, 202); a roughly disc-shaped air hole plate 6 with many air holes 7 facing the fuel nozzles 5, in which combustion air 104 passes; a roughly cylindrical liner 9 which is located downstream of and around the air hole plate 6, forming a chamber 8 for burning the mixture of fuel and air flowing out of the air holes 7; a roughly cylindrical combustor outer cylinder 10 which houses these components; and a combustor cover 11 located at an end of the combustor outer cylinder, to which the fuel nozzles 5 are attached, and which serves as a fuel supply flow path. The air hole plate 6 is located downstream in the direction in which the fuel in the fuel nozzles 5 flows, and has a plurality of air holes 7 formed in a manner to correspond to the fuel nozzles 5.

The air 102 compressed by the compressor 1 flows into the gas turbine combustor 2 and flows between the combustor outer cylinder 10 and the liner 9. Part of the compressed air 102 flows into the chamber 8, as cooling air 103 for the liner 9. The rest of the compressed air 102 passes, as the combustion air 104, through the air holes 7 made in the air hole plate 6 and flows into the chamber 8 of the gas turbine combustor 2.

The gas turbine combustor 2 according to the present embodiment is provided with fuel supply lines 201 and 202 and these fuel supply lines 201 and 202 have shut-off valves 211 and 212 and control valves 221 and 222 respectively so that the flow rate of fuel to be supplied to each of the fuel nozzles 5 can be individually controlled. The fuel nozzles 5 are connected to fuel headers 231 and 232 which distribute fuel to the fuel nozzles 5.

In the gas turbine combustor 2 according to the present embodiment, the fuel header 231 is located in the center of the combustor axis and forms a roughly disc-shaped space. The fuel header 232 is located around the fuel header 231 and forms a roughly circular space.

Fuel is supplied from the fuel supply lines 201 and 202 to the fuel headers 231 and 232 respectively. Due to this structure, the fuel nozzles 5 are divided into two groups as two fuel lines (group F1 connected to the fuel header 231 and group F2 connected to the fuel header 232) and the total amount of fuel supplied from both the fuel lines can be controlled.

A swirler lip 13 is provided on the outer periphery of the air hole plate 6 in a manner to protrude toward the chamber 8. A spring seal 12 is provided in the gap between the outer periphery of the air hole plate 6 and the swirler lip 13, and the liner 9. The spring seal 12 is a seal member which is intended to suppress leakage of a lot of air into the chamber 8 from the gap between the burner including the fuel nozzles 5 and the air hole plate 6, and the liner 9.

FIG. 2 shows details of the outer periphery of the air hole plate 6 and the end portion of the liner 9. As shown in FIG.

2, the gas turbine combustor according to the present embodiment is structured so that part of a return flow 46 of combustion air 45 can be introduced from the upstream end of a main burner 39 and also cooling air 47 can be introduced into the gap between the outer periphery of the air hole plate 6 and the swirler lip 13, and the liner 9 through an air inflow hole 17 provided at the end portion of the liner 9. FIG. 2 shows an example that an inner cylinder short pipe 18 is provided at the end portion of the liner 9 and an air inflow hole 17 is made in the inner cylinder short pipe 18.

FIG. 3 is a plan view of the spring seal 12. The spring seal 12 has an air inflow hole 15 located in a position to correspond to the air inflow hole 17 at the end portion of the liner 9 so that the cooling air introduced from the air inflow hole 17 at the end portion of the liner 9 is led to the swirler lip 13 through the air inflow hole 15 of the spring seal 12 and introduced into the chamber 8 through a cooling hole 14 made in the swirler lip 13 in order to cool the swirler lip 13.

It is desirable that the cooling hole 14 of the swirler lip 13 be inclined as shown in FIG. 2 so as to lead the cooling air 47 toward the downstream side of the chamber 8.

Furthermore, the spring seal 12 has a slit 16 and cooling air is also led from the slit 16 toward the swirler lip 13. The air inflow hole 15 of the spring seal 12 is located at the end of the slit 16 and the air inflow hole 15 is also called a stop hole in the sense that it is a "hole provided at the slit end".

As explained above, in the gas turbine combustor according to the present embodiment, part of the return flow 46 of combustion air 45 is introduced into the gap between the outer periphery of the air hole plate 6 and the swirler lip 13, and the liner 9 from the upstream end of the main burner 39 and also part of the combustion air 45 can be introduced from the air inflow hole 17 provided at the end portion of the liner 9, so the swirler lip 13 can be cooled adequately and the liner 9, located downstream of the swirler lip 13, can also be cooled. This prevents deformation or damage of the swirler lip 13 and the liner 9 which may be caused by rise in the metal temperature, so the reliability of the gas turbine combustor can be improved.

In addition, since the amount of air introduced from the cooling hole 14 of the swirler lip 13 into the chamber 8 is increased, the insufficiency of the amount of air introduced from the air holes 7a on the outer peripheral side of the air hole plate 6 can be compensated for. Therefore, the air flow rate with respect to the fuel flow rate can be stabilized, so rise in the flame temperature can be suppressed and nitrogen oxide (NOx) emissions can be reduced.

As for the size (opening area) of the air inflow hole 17 provided at the end portion of the liner 9, the number of air inflow holes 17 and the spacing between air inflow holes 17 in the axial and circumferential directions of the liner 9, it is desirable to determine the optimum size (opening area), the number of holes, and the spacing between holes on the basis of combustion characteristics evaluation of the gas turbine combustor.

Likewise, it is desirable to determine the size (opening area) of the cooling hole 14 of the swirler lip 13, the number of cooling holes 14, and the spacing between cooling holes 14 in the axial and circumferential directions of the swirler lip 13 on the basis of combustion characteristics evaluation of the gas turbine combustor.

Likewise, it is desirable to determine the size (opening area) of the air inflow hole 15 of the spring seal 12, the number of air inflow holes 15, and the spacing between air inflow holes 15 in the axial and circumferential directions of the spring seal 12 on the basis of combustion characteristics evaluation of the gas turbine combustor.

Second Embodiment

Figure 4:
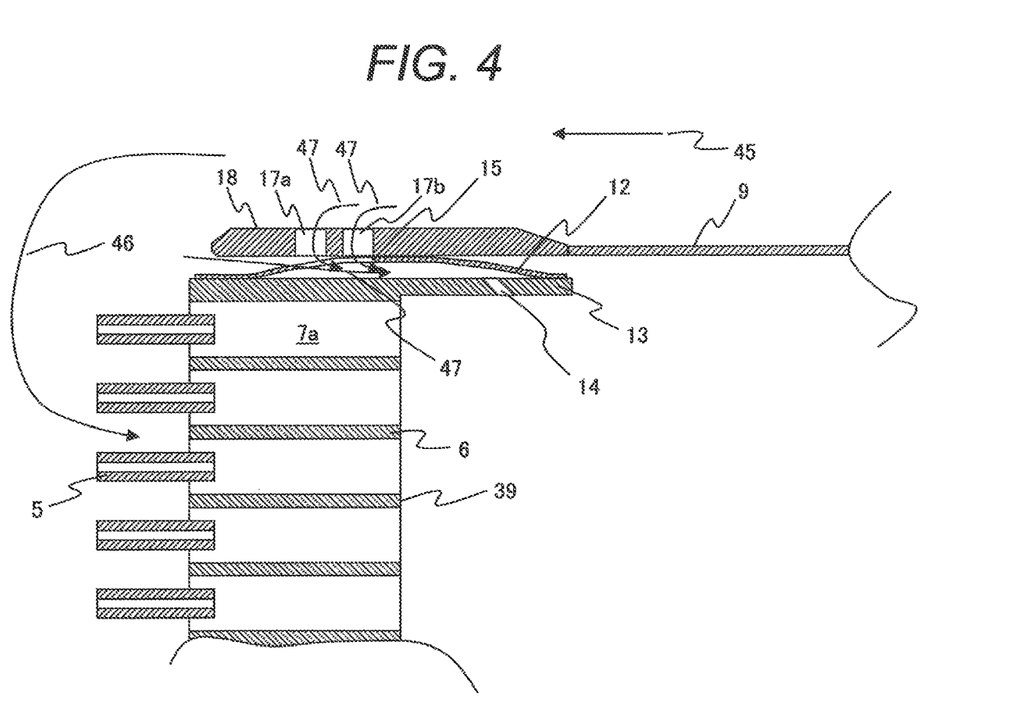
FIG. 4 is a fragmentary sectional view which schematically shows the structure of a gas turbine combustor according to an embodiment of the present invention.

Next, the gas turbine combustor according to the second embodiment will be described, referring to FIG. 4. FIG. 4 is a fragmentary sectional view which shows the structure of the outer peripheral area of an air hole plate of the gas turbine combustor according to the second embodiment. FIG. 4 corresponds to FIG. 2 which shows the first embodiment.

The gas turbine combustor according to the second embodiment is different from the gas turbine combustor according to the first embodiment in that a plurality of air inflow holes 17, in this case two air inflow holes 17a and 17b, are provided at the end portion of the liner 9 in the direction in which the combustion air 45 flows (namely, the axial direction of the gas turbine combustor). The other elements are the same as in the gas turbine combustor according to the first embodiment.

As shown in FIGS. 2 and 4, the combustion air 45 flows along the side face of the liner 9, so when two or more air inflow holes are provided in the direction in which the combustion air 45 flows (axial direction of the gas turbine combustor), cooling air can be more efficiently introduced into the gap between the outer periphery of the air hole plate 6 and the swirler lip 13, and the liner 9.

Third Embodiment

Figure 5:
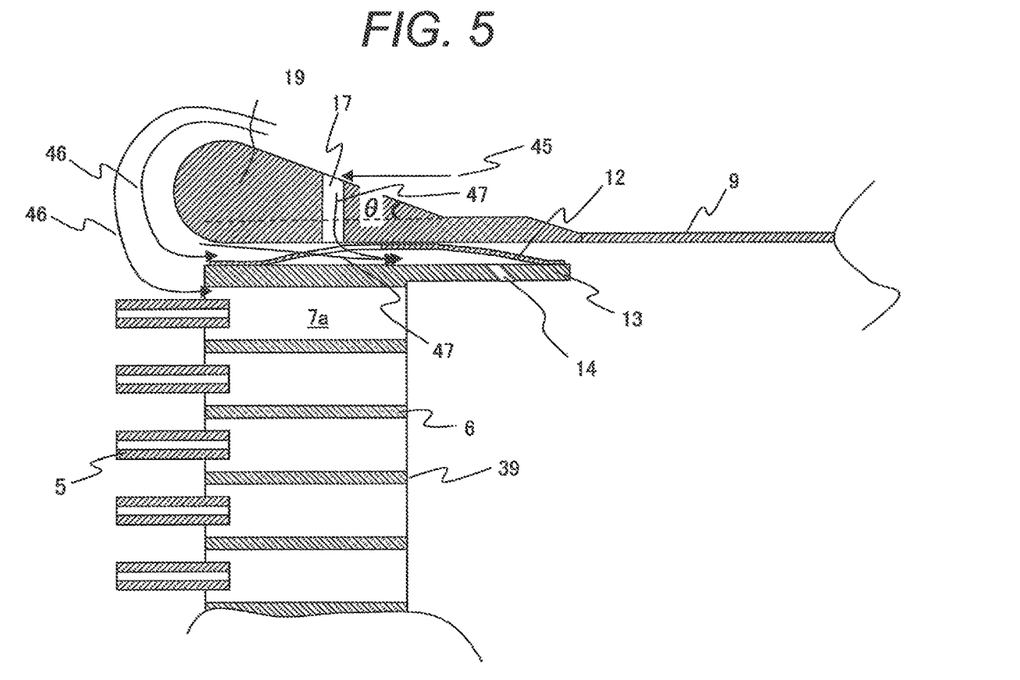
FIG. 5 is a fragmentary sectional view which schematically shows the structure of a gas turbine combustor according to an embodiment of the present invention.

Next, the gas turbine combustor according to the third embodiment will be described, referring to FIG. 5. FIG. 5 is a fragmentary sectional view which shows the structure of the outer peripheral area of the air hole plate of the gas turbine combustor according to the third embodiment. FIG. 5 corresponds to FIG. 2 which shows the first embodiment.

The gas turbine combustor 2 according to the third embodiment is different from the gas turbine combustor according to the first embodiment in that a turn guide 19 for rectifying a flow of combustion air 45 is provided at the end portion of the liner 9. The other elements are the same as in the gas turbine combustor according to the first embodiment.

As shown in FIG. 5, the turn guide 19 is provided in a manner that its surface is inclined at an angle $\theta$ with respect to the direction along the side face of the liner 9 (namely the direction in which the combustion air 45 flows). Since the turn guide 19 inclined at the angle $\theta$ is provided in this manner, the combustion air 45 is guided away from the air hole plate 6 (outward in the radial direction of the air hole plate 6), but formation of separation vortex is suppressed by the rectifying effect of the turn guide 19 on the upstream end side of the main burner 39, namely near the inlet of the gap between the outer periphery of the air hole plate 6 and the swirler lip 13, and the liner 9 or near the inlet of an air hole 7a, so more cooling air is introduced.

Due to the inclined surface of the turbine guide 19, the flow rate of combustion air 45 introduced from the air inflow hole 17 is also increased.

As a consequence, the flow rate of cooling air 47 flowing toward the swirler lip 13 is increased, so the swirler lip 13 and the liner 9 located downstream of it are cooled more effectively. In addition, the flow rate of combustion air introduced from the cooling hole 14 of the swirler lip 13 and the air holes 7a into the chamber 8 is increased, so nitrogen oxide (NOx) emissions can be reduced.

It is desirable to determine the size (range) of the turn guide 19 and the value of its inclination angle $\theta$ on the basis of combustion characteristics evaluation of the gas turbine combustor.

Fourth Embodiment

Figure 6:
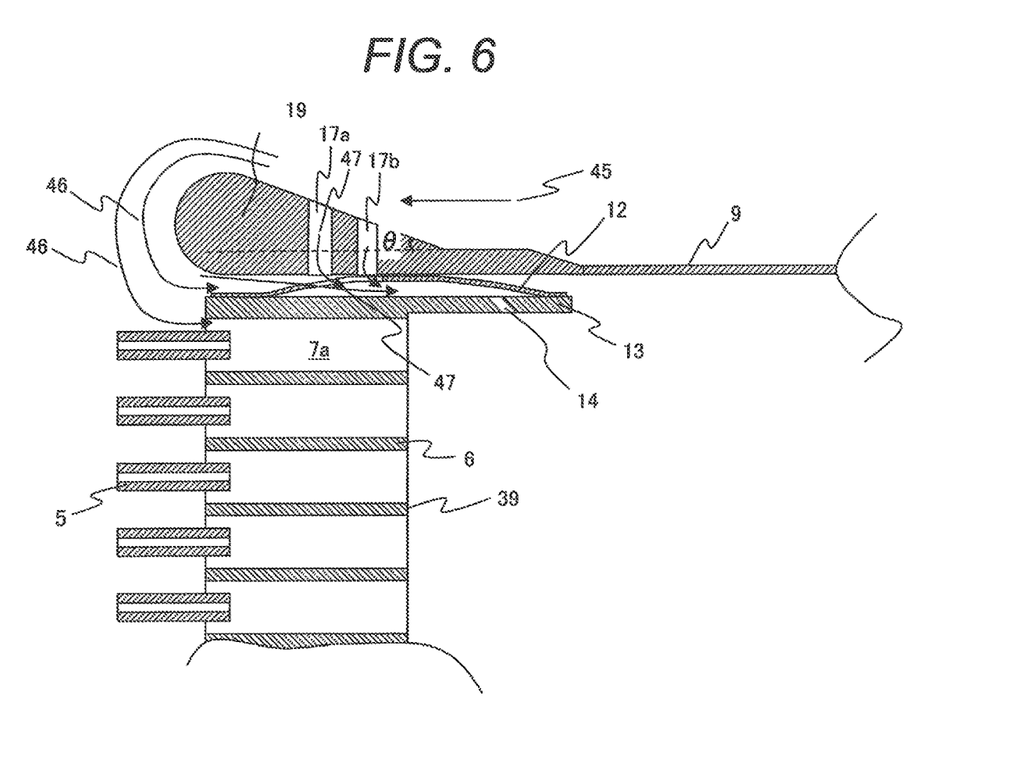
FIG. 6 is a fragmentary sectional view which schematically shows the structure of a gas turbine combustor according to an embodiment of the present invention.

Next, the gas turbine combustor according to the fourth embodiment will be described, referring to FIG. 6. FIG. 6 is a fragmentary sectional view which shows the structure of the outer peripheral area of the air hole plate of the gas turbine combustor according to the fourth embodiment. FIG. 6 corresponds to FIG. 5 which shows the third embodiment.

Although the gas turbine combustor 2 according to the fourth embodiment is the same as the gas turbine combustor according to the third embodiment in that a turn guide 19 for rectifying a flow of combustion air 45 is provided at the end portion of the liner 9, it is different from the gas turbine combustor according to the third embodiment in that a plurality of air inflow holes 17, in this case two air inflow holes 17a and 17b, are provided at the end portion of the liner 9 in the direction in which the combustion air 45 flows (namely, the axial direction of the gas turbine combustor). The other elements are the same as in the gas turbine combustor according to the third embodiment.

In addition to the same effect of the turn guide 19 as in the third embodiment, due to the existence of a plurality of air inflow holes, cooling air can be more efficiently introduced into the gap between the outer periphery of the air hole plate 6 and the swirler lip 13, and the liner 9 in the same way as in the second embodiment.

In the gas turbine combustors according to the embodiments described so far, the outer periphery of the air hole plate and the liner 9 located downstream can be cooled effectively, and deformation or damage of the swirler lip on the outer periphery of the air hole plate and the liner 9 can be prevented, thereby leading to improvement in the reliability of the gas turbine combustor. Furthermore, a sufficient amount of combustion air can be supplied to the air holes on the outer peripheral side of the air hole plate, so the combustion characteristics can be improved and nitrogen oxygen (NOx) emissions can be reduced.

The present invention is not limited to the above embodiments and may be embodied in other various forms. The above embodiments have been explained in detail for easy understanding of the invention, but embodiments of the invention need not include all the above elements. Some elements of an embodiment maybe replaced by elements of another embodiment. Also, some elements of an embodiment may be added to another embodiment. Also, addition of other elements or deletion or replacement of some elements may be made for each embodiment.

REFERENCE SIGNS LIST

1 . . . compressor,
2 . . . gas turbine combustor,
3 . . . gas turbine,
4 . . . generator,
5 . . . fuel nozzle,
6 . . . air hole plate,
7, 7a . . . air hole,
8 . . . chamber,
9 . . . liner,
10 . . . combustor outer cylinder,
11 . . . combustor cover,
12 . . . spring seal,
13 . . . swirler lip,
14 . . . cooling hole,
15 . . . air inflow hole,
16 . . . slit,
17, 17a, 17b . . . air inflow hole,
18 . . . inner cylinder short pipe,
19 . . . turn guide,
20 . . . rotor,
39 . . . main burner,
45 . . . combustor air flow
46 . . . combustion air return flow,
47 . . . swirler lip cooling air,
101 . . . gas turbine intake air (atmospheric pressure),
102 . . . compressed air,
103 . . . cooling air,
104 . . . combustion air,
105 . . . combustion gas,
106 . . . turbine exhaust gas,
201 . . . F1 fuel supply line,
202 . . . F2 fuel supply line,
211 . . . F1 fuel shut-off valve,
212 . . . F2 fuel shut-off valve,
221 . . . F1 fuel control valve,
222 . . . F2 fuel control valve,
231 . . . F1 fuel header,
232 . . . F2 fuel header

What is claimed is:

1. A gas turbine combustor comprising:
a liner constituting a chamber of the gas turbine combustor;
a plurality of fuel nozzles to inject fuel into the chamber; and
an air hole plate being located downstream of the fuel nozzles in a fuel flow direction and having a plurality of air holes corresponding to the fuel nozzles, wherein
a swirler lip is provided on an outer periphery of the air hole plate in a manner to protrude toward the chamber,
a spring seal is provided in an area where the liner is fitted to the air hole plate and the swirler lip,
the spring seal has an air hole to enable part of combustion air introduced into a gap between the outer periphery of the air hole plate and the liner to pass,
the swirler lip has an air hole to introduce part of the combustion air passing through the air hole of the spring seal into the chamber,
the liner has an air hole in a position to face the air hole of the spring seal, in order to introduce part of the combustion air from outside of the liner into the gap between the outer periphery of the air hole plate and the liner, and
a turn guide for rectifying a flow of combustion air is provided at an end portion of the liner on a side where the liner is fitted to the air hole plate.

2. The gas turbine combustor according to claim 1, wherein the turn guide is inclined so that the combustion air flowing along a side face of the liner is guided outward in an axial direction of the air hole plate.

3. The gas turbine combustor according to claim 1, wherein the air hole of the liner is provided in plurality in an axial direction of the liner.

4. The gas turbine combustor according to claim 1, wherein the air hole of the liner is provided in plurality in a circumferential direction of the liner.

5. The gas turbine combustor according to claim 1, wherein the air hole of the spring seal is provided in plurality in an axial direction of the spring seal.

6. The gas turbine combustor according to claim 1, wherein the air hole of the spring seal is provided in plurality in a circumferential direction of the spring seal.

7. The gas turbine combustor according to claim 1, wherein the air hole of the swirler lip is provided in plurality in an axial direction of the swirler lip.

8. The gas turbine combustor according to claim 1, wherein the air hole of the swirler lip is provided in plurality in a circumferential direction of the swirler lip.

9. The gas turbine combustor according to claim 1, wherein the air hole of the swirler lip is inclined so that part of the combustion air is guided toward a downstream side of the chamber.

* * * * *